Nov. 27, 1945.  F. SHERWOOD ET AL  2,390,008
RECAP TIRE BALANCING WHEEL
Filed June 5, 1944
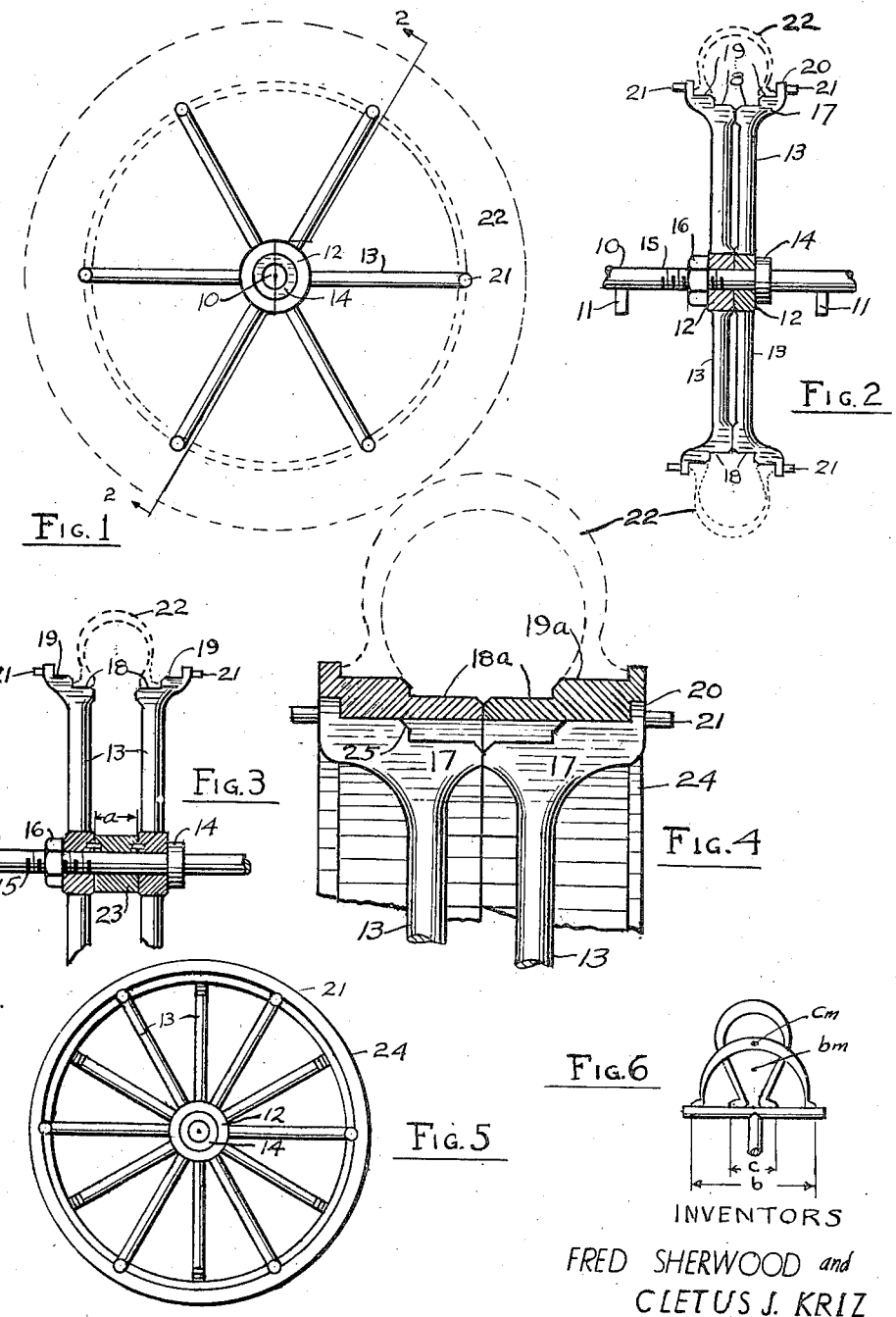
INVENTORS
FRED SHERWOOD and
CLETUS J. KRIZ
BY Martin E. Anderson
ATTORNEY Patented Nov. 27, 1945

2,390,008

UNITED STATES PATENT OFFICE 2,390,008

RECAP TIRE BALANCING WHEEL

Fred Sherwood and Cletus J. Kriz,
Cheyenne, Wyo.

Application June 5, 1944, Serial No. 538,826

1 Claim. (Cl. 144—288)

This invention relates to improvements in recap tire balancing wheels of the type disclosed and claimed in United States Patent No. 2,256,814, granted September 23, 1941.

With the high speeds at which automobiles are travelling the question of wheel balance has assumed a place of high importance. The automobile manufacturers usually take considerable care that the wheels themselves are well balanced, but it has been found that even new tires are not always perfectly symmetrical and that when they are applied to a wheel which in itself is perfectly balanced, the assembly is out of balance.

After a tire has worn to some extent, it often happens that certain portions wear faster than others and the tire therefore becomes unbalanced. When worn tires are recapped it is very essential that some means be provided for testing them so that the workmen can apply the new rubber in such a way as to produce a tire that is completely balanced and which, when applied to a balanced wheel, results in a perfectly balanced assembly.

In the patent above identified, a simple device is shown which is very useful in balancing automobile tires. Experience has shown that the tire balancing device illustrated in the above identified patent is reliable only if great care is taken in positioning the tire thereon.

It will be noted that the ends of the spokes or arms are provided with transverse portions that fit against the inside of the tire flanges; however, no means has been provided for positioning the tire the same at all points with respect to its center plane and therefore even a perfectly balanced tire may show as if it were unbalanced, for reasons which will hereinafter be pointed out.

It is the principal object of this invention to produce a tire balancing wheel of such construction that the tires positioned thereon will be held symmetrically with respect to their center planes without any special effort on the part of the operator.

Another object is to produce a tire balancing wheel of such construction that it can be used in connection with tires of different sizes, thereby obviating the necessity of having a separate balancing wheel for each size of tire.

Having thus briefly described the invention, the same will now be described in detail, and for this purpose reference will be had to the accompanying drawing in which the invention has been illustrated in its present preferred form, and in which:

Figure 1 is a side view of the tire balance wheel which forms the subject of this invention;

Figure 2 is a section taken on line 2—2, Figure 1, and shows the wheel employed in connection with one size of tire;

Figure 3 is a fragmentary view similar to that shown in Figure 2, but shows the wheel employed with a smaller tire;

Figure 4 is a fragmentary section showing the wheel provided with rings for adapting it for use with two larger sized tires;

Figure 5 is a side view of a balancing wheel having the rings applied thereto; and Figure 6 is a diagram illustrating the variation in the position of the center of mass when the tire is altered in shape.

In the drawing reference numeral 10 designates a shaft which is adapted to be supported on two spaced parallel bars 11 which form the supporting members of a rack which has not been shown nor described. The balance wheel itself consists of two identically shaped members, each having a hub 12 and six radial spokes 13. The hubs are perforated for the reception of the shaft. The shaft is provided with a flange 14 which may be integral therewith or may be formed by a collar secured thereto by a pin or in any other suitable way. The shaft has a threaded portion 15 with which the nut 16 cooperates. The ends of the spokes are provided with laterally extending portions 17 whose end surfaces are stepped. Each end portion has a flat section 18 and another similar flat section or step 19 which terminates in a stop 20. Pins 21 may project from the stops 20 as shown in the drawing and for a purpose which will hereinafter appear. The steps 18 are positioned at such distances from the center of shaft 10 that they will fit the inside of one of the smaller sizes of tires and the steps 19 are positioned at such a distance from the center that they will fit the inside of the next larger size tire. In the drawing the tire has been designated by reference numeral 22 and has been shown by dotted lines.

In Figures 1 and 2 the tire has been shown as of a size with which the steps 19 cooperate. The width of each step is such that it corresponds substantially to the width of the tire rim with which it is intended to cooperate. With the size of tire used in Figure 2, the two hub portions are positioned in close contact and are held in assembled position by means of the nut 16. In Figures 1 and 2, the spokes of the two wheel parts are positioned directly opposite each other as in this position the operation can be more readily explained and seen.

When a small tire is to be tested, one that will fit against the steps 18, the two wheel parts are spaced as shown in Figure 3 and are held in spaced relation by a ring or ferrule 23. The length of the spacer has been designated by $a$ and is equal to two times the width of steps 18 and therefore, since steps 18 and 19 are of the same width, the flanges of the tire will be positioned the same distance apart as shown in Figure 2. The importance of having the tire perfectly symmetrical with respect to a plane perpendicular to the shaft will now be explained and reference for this purpose will be had to Figure 6. When the flanges of the tire are spaced apart a distance $b$ the center of mass for the section will be located at $bm$, but when the flanges are spaced apart a distance $c$ the center of mass moves outwardly to $cm$. It is therefore apparent that unless the flanges are spaced the same distance apart at every point around the tire, even a perfectly balanced tire will show unbalance and it is for this purpose that the balancing wheel spokes have been provided with steps that terminate in radially extending stops, because with this arrangement the tire will always be symmetrical and the center of mass will always coincide with a circle whose center is the center of the shaft. The exact distance at which the tire flanges are separated is not of any particular consequence so long as they are separated equal distances at all points. However it is preferable to have the parts of such dimension that when the tire is being tested it will be in the normal position, or, in other words, with the flanges spaced the same distance as on a wheel. In the drawing the flanges have purposely been shown as spaced farther apart than normally for the sake of clearness, and besides, it is sometimes desirable to have the tire open sufficiently to permit the operator to apply balancing weights to the inner surface thereof.

Attention has previously been called to the fact that in Figures 1 and 2 the wheel spokes have been positioned directly opposite each other which gives six points of support to the tires. With some methods of balancing it is desirable to have a greater number of support points and the wheel parts can therefore be shifted to the position shown in Figure 5, in which the spokes of the two parts alternate so as to give twelve support points instead of six, although each flange will, in both cases be supported at six points only. With some methods of balancing weights are employed and for this purpose the spokes have been provided with projections 21 on which such weights can be positioned during the testing operation.

With the construction shown in Figures 1, 2 and 3, it is possible to test two sizes of tires and for this purpose the wheels are normally of such dimension as to accommodate two of the most popular sizes. Where larger sizes are to be tested than this, they can be accommodated if adjusting rings 24 like those shown in Figure 4 are applied to the wheel spokes. Rings 24 have inner surfaces of such contour that they fit the steps 19 and are each provided with two steps which have been designated by reference numerals 18a and 19a. The outside diameter of steps 18a is larger than the corresponding dimension of step 19 in an amount equal to the difference in the inside diameter of tire 22 shown in Figure 2 and that of the next larger size and the difference between the diameters of steps 18a and 19a corresponds to the difference in diameter between the corresponding sizes of tires. By providing two adjusting rings 24 for each set of two-wheel parts, the wheel can be employed for testing four different sizes of tires. It is also possible to provide rings of different dimensions and in this way, by changing rings of one size for those of another, it is possible to test all sizes of tires above the minimum with the same wheel assembly.

It is, of course, understood that the wheel parts having the hubs and the spokes are perfectly balanced statically and that the adjusting rings are turned so as to be uniform at all points and therefore the wheel parts will remain perfectly balanced after the rings are applied.

Attention is called to the fact that the walls at the end of each step are bevelled as indicated at 25 to facilitate the application of the tires.

With the device shown on the drawing and described herein, it becomes possible to test various sizes of tires to determine their static unbalance and when the tires are found to be unbalanced, weights can be positioned at various places to reestablish static balance. The method of balancing will, however, not be explained herein, as it has been reserved for the subject of another application.

Having described the invention what is claimed as new is:

A separable wheel, for use in balancing tire casings, said wheel consisting of two similar and opposing halves mounted face to face upon a shaft for axial adjustment with respect to each other, each half comprising, a hub having a central opening for the reception of a shaft, a plurality of integral spokes extending radially therefrom, the ends of the spokes terminating in portions widened in the direction of the axis of the hub opening, each widened end portion having a tire supporting surface that is parallel with the axis of the hub, each surface terminating at its outer end in a radially extending stop, all of the stops being on the same side of the spokes and spaced the same distance from the plane of the spokes, and means for securing the two halves in a predetermined relative position upon said shaft.

FRED SHERWOOD.
CLETUS J. KRIZ.